C. L. HEISLER.
ROTATIVE VIBRATORY TESTING MACHINE.
APPLICATION FILED FEB. 13, 1915.
1,193,686.
Patented Aug. 8, 1916.
4 SHEETS—SHEET 1.
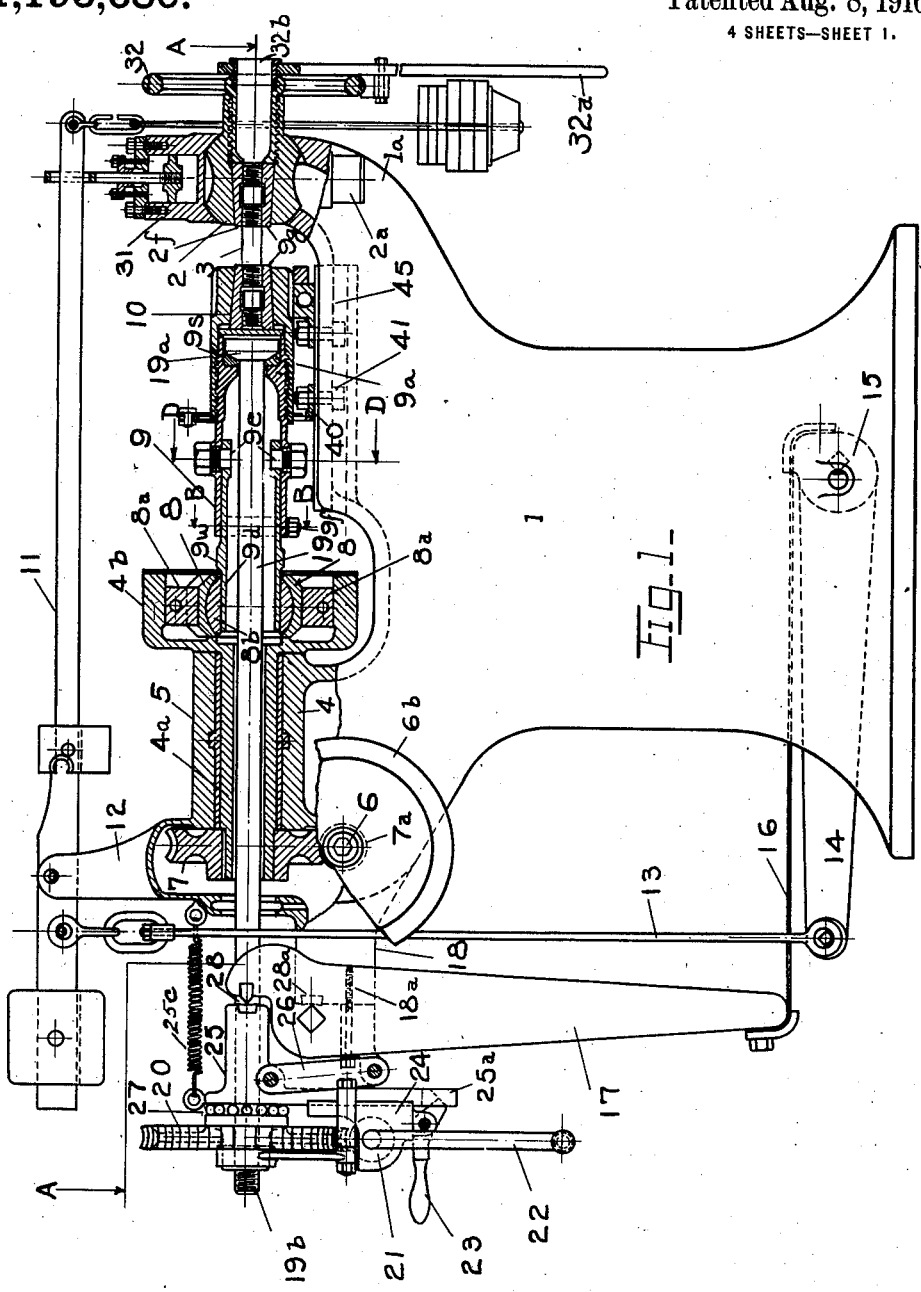
WITNESSES
INVENTOR
Charles L. Heisler

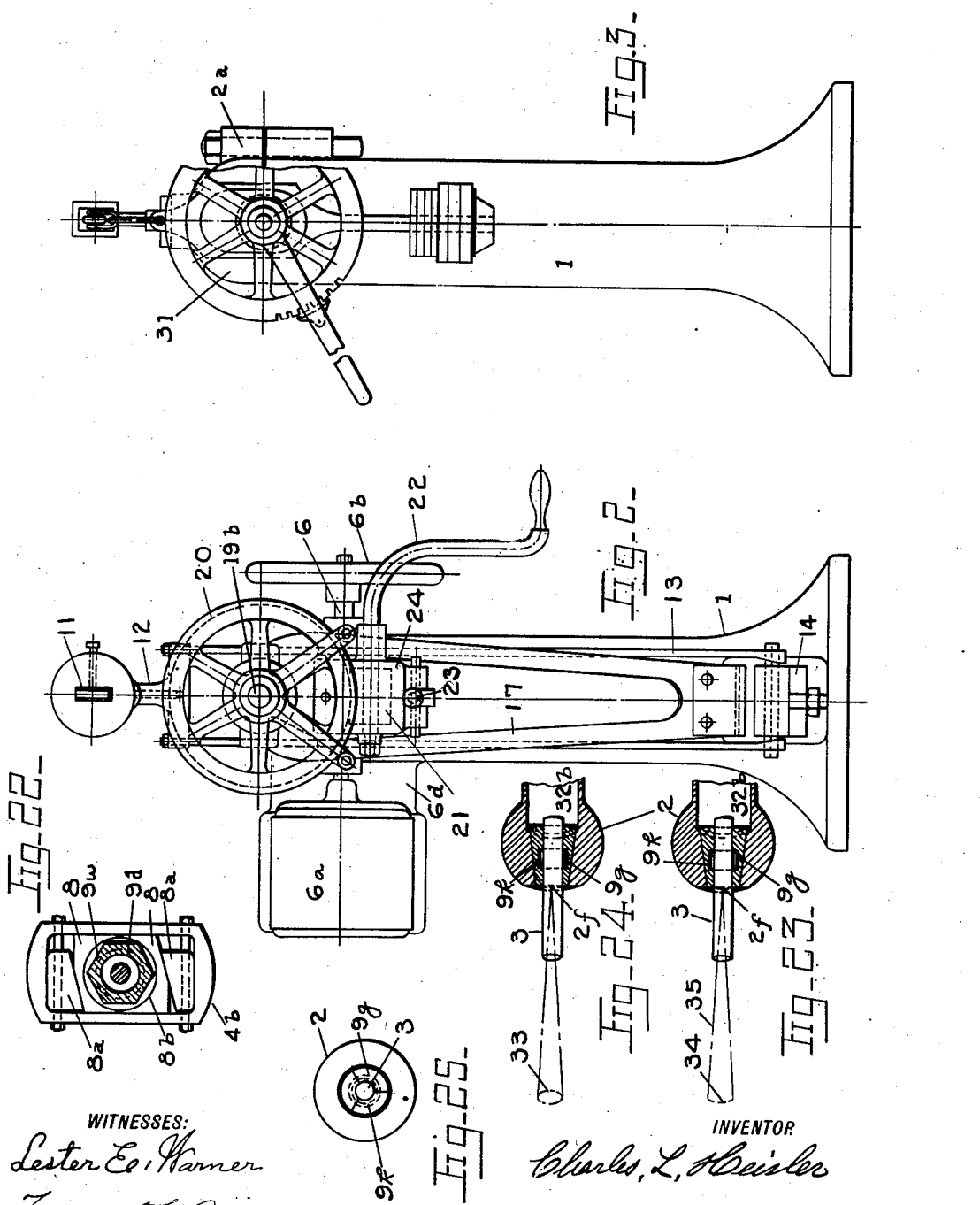

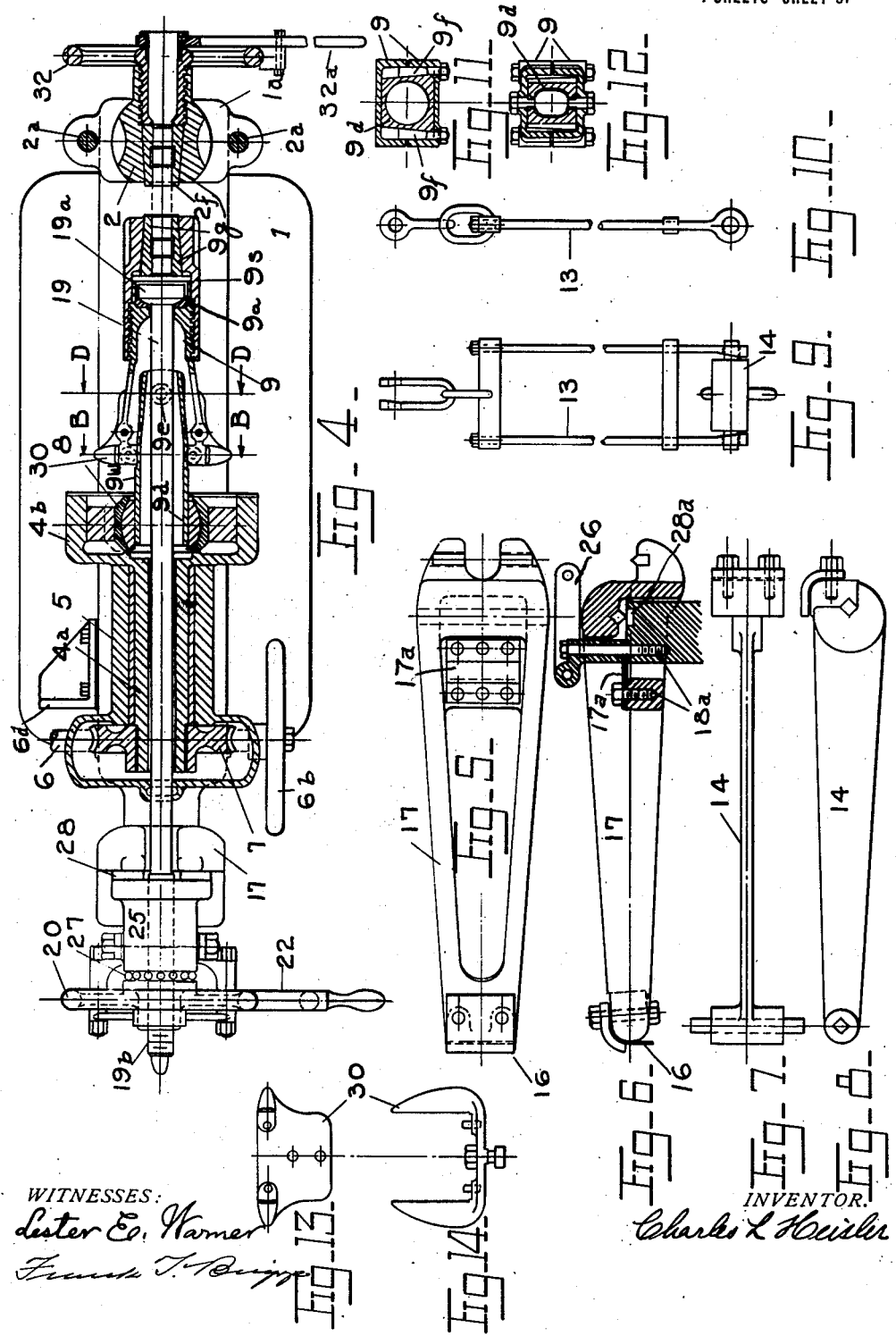

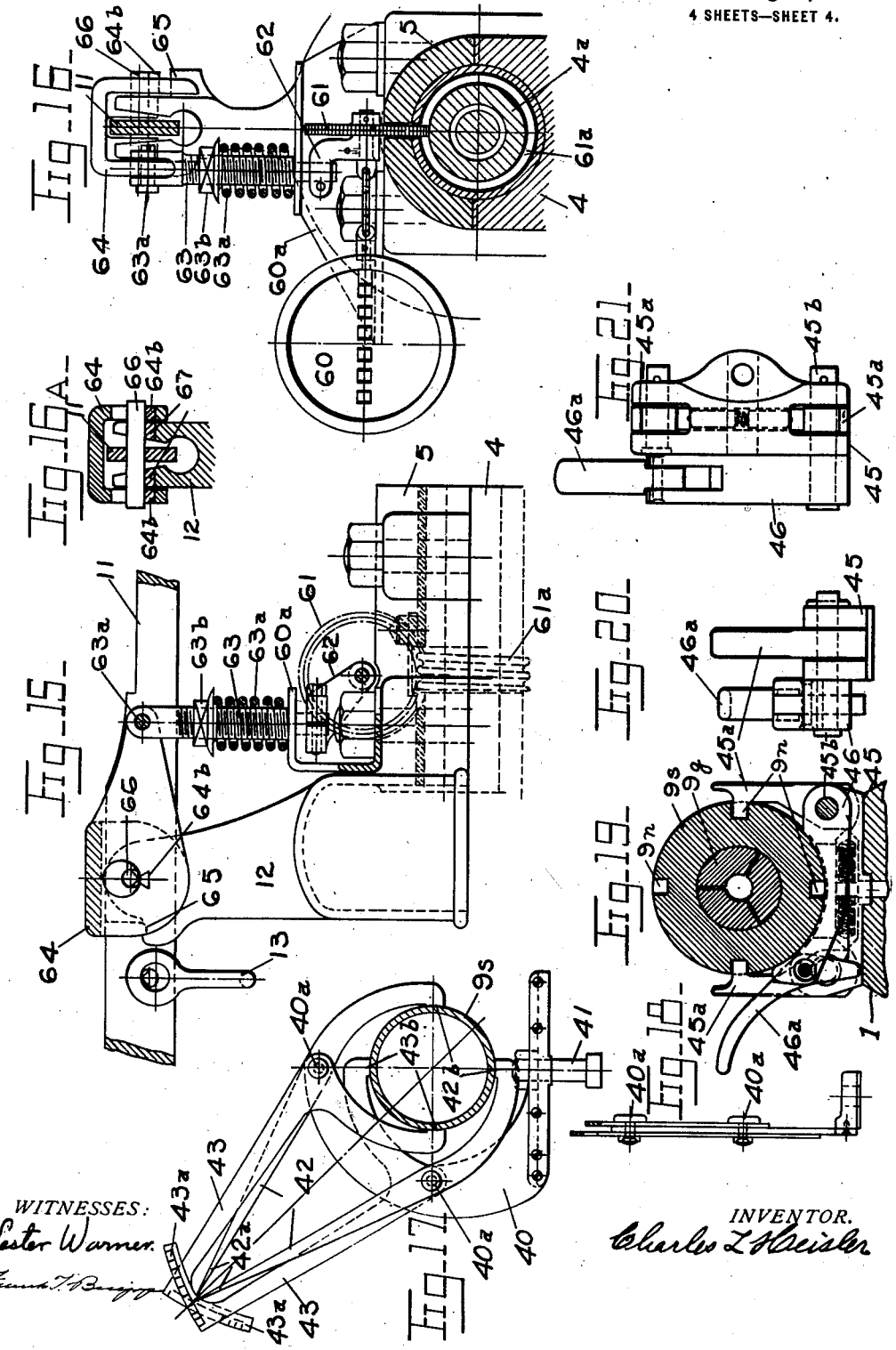

UNITED STATES PATENT OFFICE.

CHARLES L. HEISLER, OF SCHENECTADY, NEW YORK.

ROTATIVE VIBRATORY TESTING-MACHINE.

1,193,686.  Specification of Letters Patent.  Patented Aug. 8, 1916.

Application filed February 13, 1915. Serial No. 8,081.

*To all whom it may concern:*

Be it known that I, CHARLES L. HEISLER, a citizen of the United States, residing at Schenectady, in the county of Schenectady and State of New York, have invented certain new and useful Improvements in Rotative Vibratory Testing-Machines, of which the following is a specification.

My invention relates more particularly to a machine for imparting to a test specimen a tensile stress and fatigue due to bending stresses resulting from predetermined and measured lateral deflections, which are continually changed in direction by rotation of the machine.

The object is to provide more convenient and accurate means for measuring the deflection of the specimen; to lessen the heating due to excessive pressure on the bearings which apply the bending stresses; to provide greater convenience in observing the specimen fastening and effect of applied fatigue and stress; to obtain accurate reading of the applied tensile stress by avoiding the transmission of vibratory forces to the weighing mechanism; to provide a more powerful and rigid grip on the specimen for the purpose of increasing the capacity and reliability of the machine.

In the several drawings forming part of this specification, Figure 1 is a longitudinal elevation, part exterior and part sectional view, of the assembled machine; Figs. 2 and 3, exterior end elevations thereof; Fig. 4, a plan view, the part in section being taken on the plane A A of Fig. 1; Figs. 5, 6, 7, 8, 9, and 10, are details of the tensile stress weighing device; Figs. 11 and 12, transverse sectional views taken on the vertical planes B B, and D D, of the vibratory quill; Figs. 13 and 14, details of a vibratory quill guide; Figs. 15, 16, and 16$^A$, details of automatic counter stop in longitudinal and transverse elevations respectively; Figs. 17 and 18 detailed elevations of means for measuring deflections of the test specimen when subjected to stresses and fatigue; Figs. 19, 20 and 21, detailed views of means for holding the vibratory quill chuck, Fig. 22, a transverse view of an adjustable eccentrically journaled head, Figs. 23, 24, and 25, details of conical specimen grips and diagrammatically illustrate the motion imparted to the movable end of a test specimen.

The numeral 1, is a box type of base adapted to form a foundation and support for the mechanism of the machine, and has an outwardly and upwardly projecting arm, 1$^a$, formed at its right side to provide a bearing for the spherical chuck shell 2, which is adapted to adjust and rigidly fasten the test specimen 3, and will be described hereinafter. A long journal bearing 4, having a cap 5, is formed on the left side of the base, and supports a tubular spindle or journal 4$^a$, in horizontal alinement with the chuck 2. A transversely disposed motor shaft 6, having a small hand wheel 6$^b$, and a worm 7$^a$, formed thereon, is pivotally supported on the upper left side of the base, and is coupled in usual manner to the worm wheel 7, and supports a tubular spindle or journal 4$^a$. This construction provides a means for rotating the head 4$^b$, formed on the right end of the journal 4$^a$, from the electric motor 6$^a$, which is coupled to the shaft 6, and supported on a bracket 6$^d$, formed on the rear side of the base 1. The pair of laterally adjustable spherically bored bearings 8, are inclosed, positioned and rotated, by the head 4$^b$. They are slidingly fitted in the head and adjusted transversely by the pair of abutting and oppositely disposed wedges 8$^a$, in a manner to give any predetermined amount of eccentricity to the spherical ring 8$^b$, which is embraced by the bearings 8. The bore of the ring 8$^b$, provides a combined sliding and rotating bearing for the left, or journaled end of the chuck quill member 9$^d$. This member is hinge connected within the hollow chuck or vibrating head 9, by means of a pair of oppositely disposed pivotal screw bolts 9$^e$. A pair of removable wedges 9$^f$, are interposed between the member 9$^d$, and the chuck head 9, when it is desired to rigidly couple them and act as an integral piece. The threaded chuck sleeve 9$^s$, is coupled to the vibratory head 9, by engaging with corresponding threads formed on the right end thereof, in a manner to provide for longitudinal adjustment for the purpose of tightening the conically formed segmental grips $9^g$, which are embraced by the conically bored right end of the sleeve $9^s$. This conical bore 10, and the grips $9^g$, are like the corresponding bore and grips in the spherical chuck sleeve 2, being disposed in axial alinement therewith and adjacent thereto, for the purpose of rigidly gripping opposite ends of the test specimen 3. A horizontal tension pull rod 19, has a head $19^a$, formed at its right end which thrusts against the ball bearing $9^a$, formed in the hollow head 9, which transmits tension through the sleeve $9^s$, and the grips $9^g$, to the specimen 3. The bore of the member $9^d$, and the journal $4^a$, being much larger than the rod 19, a predetermined amount of eccentricity can be given the bearing 8, to give any desired circular path of rotation, within determined limitations, to the ring $8^b$, and the left journaled end of $9^d$. This motion being transmitted by the rigidly connected members $9^d$, 9, $9^s$ and $9^g$, to the specimen 3, with a reduction corresponding to the distance from the face $2^f$, of the fixed specimen chuck 2, at which point the motion becomes zero, and would be the apex of an imaginary conical figure, described by a prolonged axis of the specimen.

Tension stress is applied manually by means of the worm wheel 20, the threaded hub of which engages corresponding threads $19^b$, formed on the left end of the tension rod 19. A worm 21, rotated by the crank 22, engages the worm wheel 20. A worm box 24 is slidingly mounted upon the downwardly projecting arm $25^a$, of the crosshead 25. The worm may be raised into, or lowered from, engagement with the wheel 20, by actuating the trip lever 23, that is pivoted on the worm box 24. The ball race 27, is interposed between the crosshead 25, and the wheel 20, to take thrust from the tension rod 19, which is transmitted to the vertical weighing beam 17, by the knife edge bearing 28. The crosshead is pivotally supported by the links 26, that are mounted on a bracket 18, projecting from the left side of the base 1. This bracket has a knife edge bearing $28^a$, against which the vertical beam 17, fulcrums, and is coupled thereto by the thin sheet steel member $17^a$, and the bolts $18^a$.

The scale beam 11, is disposed horizontally above the machine and coupled at its left by the pair of vertical rods 13, the horizontal intermediate weighing lever 14, disposed in the base and pivoted on a knife edge at 15. A thin sheet metal tension band 16, disposed horizontally within the base, couples the lever 14 and the beam 17, thereby completing the simple weighing and tension mechanism interposed between the scale beam 11, and the test specimen. This scale beam is pivotally supported on a bracket 12, which is formed on the bearing cap 5, in a manner to also effectively house the worm wheel 7.

The spherical chuck sleeve 2, is rigidly fastened to the base 1, after setting it in axial alinement by the vertical clamp bolts $2^a$, which clamp the spherically bored cap 31, to the base 1. The conical grips $9^g$, are moved longitudinally, and tightened upon the specimen by manually rotating the chuck wheel or member 32, which has a suitable ratchet lever $32^a$, of usual construction coupled therewith. The wheel has an axially disposed opening $32^b$, to permit inserting, or removing, the test specimen.

When it is desired to change the circular rotative path 33, of the left, or movable end of the specimen 3, to a vertical reciprocating path, generating an imaginary arc 34, whose radius 35, sweeps out a sector and has its radial center in the face $2^f$, of the chuck 2; it is only necessary to remove the wedges $9^f$, to give freedom of motion to the member $9^d$, about the pivots $9^e$, in the head 9; and to place the guide 30, on the machine as shown in Fig. 4, to slidingly engage the opposite sides of the head 9, at its left end in a manner to permit its movement in a vertical plane only. The pivot $9^e$, compensates for any lateral motion due to the circular rotating path of the ring $8^b$, and the journaled end of the member $9^d$.

The machine is set for a specified angular deflection of the specimen by laterally adjusting the bearing 8, with the wedges $8^a$, until the chuck sleeve $9^s$, deflects from the axial center line of the machine a desired amount which is measured by the duplex caliper 40, fastened on the T slotted top of the base by a bolt 41, at a predetermined distance, toward the left, from the chuck face $2^f$. The caliper frame, has two pivotal bearings $40^a$, formed thereon, one vertically above, and one horizontally and laterally from, at equal distances from the axial center line of the machine, in a manner to measure the lateral and vertical vibration, shown by radius members 42 and 43, which extend radially outward and in pairs from the pivotal bearings $40^a$, in a manner to give a reading on a segmental scale $43^a$, by the pointer $42^a$, corresponding to the movement of the contacts $42^b$, and $43^b$, formed on the curved lower extremities of the radial members which touch, and are moved by contact with, the periphery of the vibrating sleeve $9^s$, when the head $4^b$, rotates. The sleeve $9^s$, chuck head 9, and the member $9^d$ do not rotate, excepting when tightening the chuck to insert, or remove, the specimen 3.

After freeing the sleeve $9^s$, and the chuck wheel 32, by screwing them toward the right, to permit the springs $9^k$, to expand the conical grips, a test specimen may be inserted from the right through the axial opening formed in the hollow threaded hub of the wheel, and into the grips embraced by the sleeve 9ˢ. The pair of latch dogs 45ᵃ, pivoted on the wrench 45, are then brought into engagement with the notches 9ⁿ, formed in the sleeve 9ˢ. This wrench being bolted to the T slotted base 1, securely holds the sleeve while applying any long suitable wrench to the quill member 9ᵈ, at 9ʷ, for the purpose of tightening the quill chuck on the movable end of the specimen. For convenience in centering the quill chuck when inserting a specimen, the lever 46ᵃ, pivoted on the centering arm 46, is lifted to the upper position shown, thereby causing it to engage and center the sleeve in axial alinement with the chuck 2, after which the lever 46ᵃ, is again dropped to give clearance required under the sleeve for unrestricted vibratory movement thereof. The arm 46, is pivoted on the latch dog bolt 45ᵇ.

The enlarged detail drawings, Figs. 15, 16 and 16ᵃ illustrate means for automatically starting and stopping at the beginning and close of a test, the revolution counter 60, coupled to the worm wheel 61, and the worm 61ᵃ, formed on the journal bearing 4ᵃ. The worm wheel is pivotally supported on a journal bearing formed on the small bracket 62, that is fastened to the vertical spring adjusting bolt 63. This bolt is slidingly supported at its lower end by a stationary bracket 60ᵃ, which also supports the counter. Its upper end is pivotally coupled to a movable member or yoke lever 64, by a pin 63ᵃ. This yoke is pivoted on the bracket 12, at 65, and has a pair of supplementary pivotal bearings 64ᵇ, formed thereon, and disposed on opposite sides of the horizontal scale beam 11, in a manner to engage with the knife edged scale beam trunnion 66, and lift the beam from its primary pivotal bearings 67, by the upward thrust of the spring 63ᵃ, through the bolt 63. This spring is adjusted by the nut 63ᵇ, in a manner to exert just sufficient upward thrust to lift the scale beam when there is a minimum downward pull at 13, and no measured stress on the test specimen.

A tension spring 25ᶜ, is coupled between the head 25, and the stationary member or bracket 12, formed on the bearing cap 5, for the purpose of holding the bead against the weighing beam 17, at the knife edge bearing 28, and the beam 17, against the bearing 28ᵃ, in their relative normal working position when no stress is being measured by the weighing mechanism.

What I claim is:

1. The combination in a vibratory testing machine, of a base having formed thereon a journal bearing and means for rigidly fastening one end of a test specimen, a head formed on a spindle supported in said bearing, means for rotating the head, an eccentric journal bearing having means for lateral adjustment positioned and carried by the head, a vibratory chuck member journaled eccentrically at one end in said eccentric bearing and extending axially outward therefrom to the chuck formed on said member and adapted to engage and vibrate the opposite or movable end of the specimen.

2. The combination in a vibratory testing machine, of a base having formed thereon a journal bearing and means for rigidly fastening one end of a test specimen, a head formed on a spindle supported in said bearing, means for rotating the head, an eccentric journal bearing having means for lateral adjustment positioned and carried by the head, a vibratory chuck member eccentrically journaled at one end in said eccentric bearing, and extending outward therefrom to the chuck formed on said member and adapted to engage and vibrate the opposite or movable end of the specimen, a tension rod coupled to said chuck and means for applying tension to said rod.

3. The combination in a vibratory testing machine, of a base having formed thereon a journal bearing and means for rigidly fastening one end of a test specimen, a head formed on a spindle supported in said bearing, means for rotating the head, an eccentric journal bearing having means for lateral adjustment, positioned and carried by the head, a vibratory chuck member eccentrically journaled at one end in said eccentric bearing and extending outward therefrom to the chuck formed on the chuck member and adapted to engage and vibrate the opposite or movable end of the specimen, a tension rod coupled to said chuck and a weighing mechanism adapted to measure the stress applied through said rod to the specimen.

4. The combination in a vibratory testing machine, of a base having formed thereon a journal bearing and means for rigidly fastening one end of a test specimen, a head formed on a tubular spindle supported in said bearing, means for rotating the head, an eccentric journal bearing having means for lateral adjustment positioned and carried by the head, a tubular vibratory chuck member having a chuck formed thereon and actuated by the head, means for weighing and applying tension, and a tension rod disposed within said spindle and vibratory chuck member, coupled to said chuck and to the tension and weighing means.

5. The combination in a vibratory testing machine, of a base having formed thereon a journal bearing and means for rigidly fastening one end of a test specimen, a head formed on a spindle supported in said bearing, means for rotating the head, a laterally adjustable spherical bearing and a ring embraced thereby positioned by said head, and a vibratory chuck member journaled at one end in said ring and having a chuck formed on its other end adapted to engage and vibrate the movable end of said test specimen.

6. The combination in a vibratory testing machine, of a base having formed thereon a journal bearing and means rigidly fastening one end of a horizontally disposed test specimen, and having a horizontally disposed journal bearing formed on the opposite side thereof, a rotary head journaled in said horizontal bearing and fitted with an eccentrically disposed bearing, a vibratory member connected with the eccentric bearing and disposed horizontally above the base and between said fixed chuck and the rotary head, and having a chuck formed thereon and engaging with the test specimen, with a predetermined distance between the chucks to give access to the specimen.

7. The combination in a vibratory testing machine mounted upon a base having a horizontal journal bearing and means for rigidly fastening one end of a test specimen, a head formed on a spindle supported horizontally in said bearing, means for rotating the head, means for laterally adjusting an eccentric journal bearing positioned and carried by the head, a vibratory member journaled eccentrically at one end in said eccentric bearing and extending axially outward therefrom to a chuck formed on said member and adapted to engage and vibrate the opposite or movable end of the specimen, and a scale beam disposed approximately horizontally and parallel with, and at some distance above the spindle.

8. The combination in a vibratory testing machine, of a base having formed thereon a journal bearing and means for rigidly fastening one end of a test specimen, a rotary head journaled in said bearing, and having an eccentrically journaled bearing formed in the head, a vibratory member connected with said eccentric bearing and having a chuck formed thereon adapted to engage the opposite or movable end of the specimen, and means adapted to engage said vibratory member and measure its lateral and vertical vibrations at any predetermined distance from said means for fastening the specimen.

9. The combination in a vibratory testing machine, of a base having formed thereon a journal bearing and means for rigidly fastening one end of a test specimen, a rotary head journaled in said bearing, and having an eccentrically journaled bearing formed in the head, a vibratory member connected with said eccentric bearing and having a chuck formed thereon adapted to engage the opposite or movable end of the specimen, means for weighing tension applied to said specimen comprising a tension rod coupled to the vibratory member, a vertically disposed weighing beam coupled to said rod and to a horizontally disposed weighing scale beam; and means for applying tension to said rod.

10. The combination in a vibratory testing machine, of a base having formed thereon a journal bearing and means for rigidly fastening one end of a test specimen, comprising an adjustable spherical chuck shell having a conical bore and conical segmental specimen grips embraced thereby and means for adjusting the grips, of a rotary head journaled in said bearing, and having an eccentrically journaled bearing formed in the head, a vibratory member connected with said eccentric bearing and having a chuck formed thereon adapted to engage the opposite or movable end of the specimen.

11. The combination in a vibratory testing machine, of a base having formed thereon a journal bearing and a fixed chuck for rigidly fastening one end of a test specimen, a rotary head journaled in said bearing and having an eccentrically journaled bearing formed therein, a vibratory member connected with said eccentric bearing and having a chuck formed thereon adapted to engage the opposite or movable end of the specimen, and an adjusting member or wheel engaging said fixed chuck and having an axially disposed opening formed thereon for inserting and removing the test specimen.

12. In a testing machine, having rotating members mounted thereon, the combination with means for applying stress to a test specimen, of a weighing mechanism adapted to measure said stress and having a horizontally disposed weighing beam pivoted upon the machine, a primary pivotal bearing formed on the machine adapted to support said scale beam, a supplementary pivotal bearing formed on a movable member coupled with and adapted to lift said beam free from said primary bearing when not measuring stress, a revolution counter adapted to engage with, or disengage from, said rotating members, and means for coupling said counter with said movable member in a manner to disengage it from the rotating members by the lift of said movable member, and to engage the counter by a depression of the beam when measuring stresses.

13. In a testing machine, having rotating members mounted thereon, the combination with means for applying stress to a test specimen, of a weighing mechanism adapted to measure said stress and having a horizontally disposed weighing beam pivoted upon the machine, a primary pivotal bearing formed on the machine adapted to support said beam, a supplementary pivotal bearing formed on a movable member coupled with and adapted to lift said beam free from said primary bearing when not measuring stress, a revolution counter adapted to engage with, or disengage from, said rotating members, and means for coupling said counter with said movable member in a manner to disengage it from the rotating members by the lift of said movable member and to engage the counter by a depression of the beam when measuring stresses, and a lifting spring coupled to said movable member for the purpose of supplying lifting force.

CHARLES L. HEISLER.

Witnesses:
 LOUIS L. PARK,
 E. J. APPS.